(12) United States Patent
Goodzeit et al.

(10) Patent No.: US 6,481,672 B1
(45) Date of Patent: Nov. 19, 2002

(54) GIMBALED THRUSTER CONTROL SYSTEM

(75) Inventors: Neil Evan Goodzeit, Palo Alto, CA (US); Santosh Ratan, Highland Park, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/761,840

(22) Filed: Jan. 18, 2001

(51) Int. Cl.$^7$ ................................................. F03H 5/00
(52) U.S. Cl. .......................................... 244/169; 701/13
(58) Field of Search .............................. 244/158 R, 164, 244/169, 171, 172, 3.21, 3.22; 701/13

(56) References Cited

U.S. PATENT DOCUMENTS

| | | | |
|---|---|---|---|
| 4,767,084 A | | 8/1988 | Chan et al. |
| 5,100,084 A | | 3/1992 | Rahn et al. |
| 5,349,532 A | | 9/1994 | Tilley et al. |
| 5,765,780 A | * | 6/1998 | Barskey et al. ............ 244/165 |
| 5,984,236 A | * | 11/1999 | Keitel et al. ............... 244/164 |
| 5,984,237 A | * | 11/1999 | Goodzeit .................... 244/169 |
| 6,032,904 A | * | 3/2000 | Hosick et al. .............. 244/169 |
| 6,102,337 A | * | 8/2000 | Quartararo ................. 244/169 |
| 6,260,805 B1 | * | 7/2001 | Yocum, Jr. et al. ......... 244/164 |
| 6,296,207 B1 | * | 10/2001 | Tiley et al. ................ 244/169 |

FOREIGN PATENT DOCUMENTS

| | | |
|---|---|---|
| EP | 0499815 | 8/1992 |
| EP | 0922635 | 11/1993 |

OTHER PUBLICATIONS

Voss, L, "New Thrust for U.S. Satellites," Aerospace America, American Institute of Aeronautics & Astronautics, New York, vol. 38, No. 2, Feb. 2000, pp. 36–40.

"Electric Propulsion," Aerospace America, American Institute of Aeronautics & Astronautics, New York, vol. 30, No. 12, Dec. 1, 1992, p. 42.

Anzel, B., "Stationkeeping the Hughes HS 702 Satellite with a Xenon Ion Propulsion System," Congress of the International Astronautical Federation, Sep. 28, 1998.

* cited by examiner

*Primary Examiner*—Peter M. Poon
*Assistant Examiner*—Timothy D. Collins
(74) *Attorney, Agent, or Firm*—Swidler Berlin Shereff Friedman, LLP

(57) ABSTRACT

A method for controlling spacecraft velocity. A thruster torque gimbal angle command is calculated to provide a desired thruster torque demand command including a desired momentum adjust torque and a desired attitude control torque. A velocity change error between a commanded velocity change and an actual velocity change, a commanded force vector based on the error to cause the actual velocity change to approach a commanded velocity change, and force gimbal angle commands and force thrust commands to achieve the commanded force vector are calculated; and/or an error between gimbal angles and thrust levels and reference gimbal angles and thrust levels, reference gimbal angle commands and reference thrust commands to drive actual gimbal angles and thrust levels toward reference gimbal angles and reference thrust levels are calculated. A total gimbal angle command is calculated by adding the torque gimbal command with at least one of the force gimbal angle command and the reference gimbal angle command. A total thrust command is calculated including at least one of the force thrust command and the reference thrust command. The thrusters are gimbaled to the total gimbal angle command and a level of thrust produced by the thrusters is varied according to the total thrust command.

17 Claims, 3 Drawing Sheets

GIMBALED THRUSTER CONTROL SYSTEM

FIELD OF THE INVENTION

The present invention relates to a method and system that can achieve simultaneous attitude, momentum, and orbit control using gimbaled and throttled thrusters.

BACKGROUND OF THE INVENTION

For a spacecraft to perform its mission generally requires control of its in-orbit position relative to the Earth. For example, the orbit of a geosynchronous communications spacecraft is controlled so that the spacecraft remains stationed above the equator at a fixed earth longitude within small tolerances in the north/south and east/west direction. This position control is necessary to allow access to the satellite using fixed-direction ground antennas and to prevent both signal and physical interference with nearby spacecraft.

The orbit control is accomplished by performing periodic orbital correction maneuvers, where thrusters are fired to change the spacecraft's velocity. During maneuvers, the attitude of the spacecraft is controlled so that it remains correctly pointed relative to the Earth and the momentum stored by actuators such as reaction or momentum wheels is adjusted. The fuel efficiency of the system is determined not only by the thruster technology used, but also by how the attitude and momentum control and the velocity change tasks are accomplished. Systems are desired that are as efficient as possible, thereby reducing the propellant required and allowing the payload mass of the spacecraft to be increased.

Various types of thrusters may be used to produce an orbital velocity change. For example, Hall Current Thrusters that accelerate Xenon ions through an electric field to generate thrust may be utilized. Alternatively, Arcjet thrusters that heat hydrazine decomposition products using an electric arc may be employed. Generally, thruster technology is selected that provides the highest propellant efficiency and is compatible with the spacecraft design. Whichever types of thrusters are utilized, they typically are mounted on a spacecraft or on a boom or other structure attached to a spacecraft to provide components of thrust in at least the east/west and north/south directions.

Early prior-art systems utilized thrusters whose thrust directions are fixed in the spacecraft body frame. Attitude and momentum control is provided during velocity change maneuvers by firing separate attitude control thrusters, typically hydrazine thrusters known as rocket engine assemblies or REAs. Because the control thrusters are generally much less fuel efficient than the velocity change thrusters, the overall system fuel efficiency is reduced using this approach.

Recently, improved methods have been introduced that mount the velocity change thrusters on gimbaled platforms. The gimbaling allows the orientation of each thruster's thrust vector to be varied. By commanding changes in the gimbal angles and possibly the thrust levels of the velocity change thrusters, attitude and momentum control can be provided without firing separate control thrusters.

These systems provide improved fuel efficiency, but still have several drawbacks. First of all, the direction of the applied velocity change is not actively controlled. For example, firing thrusters to produce a velocity change in the north/south direction may also produce an unwanted change in the east/west direction. A separate maneuver is then required that applies an east/west thrust impulse to correct the orbit for the effects of the unwanted east/west impulse. These additional correction maneuvers use fuel, which must be carried at the expense of added payload mass. In addition, known systems do not provide the capability to control the thruster orientations to be close to reference cant angles while a maneuver is in progress. Known systems simply command whatever changes in gimbal angles or thrust levels are necessary to achieve the required torque.

To improve fuel efficiency over that possible using known systems it may be desired to control the cant angles of the velocity change thrusters relative to the solar array. Such cant angles may be determined to maximize the thrust in the north/south direction or to achieve some other objective such as to minimize solar array plume impingement. Systems are needed that can drive the thruster cant angles as close as possible to desired reference cant angles while simultaneously providing attitude and momentum control and achieving the commanded velocity change.

Among advantages of the present invention are that it can address the above-described limitations as well as other limitations of the known systems.

SUMMARY OF THE INVENTION

The invention uses gimbaled and throttled thrusters to produce a commanded change to the spacecraft's orbital velocity, while simultaneously providing attitude and momentum control. A key advantage of the invention is that it can provide active control of the magnitude and direction of the applied impulse or velocity change. In addition, it can control the thruster cant angles and thrust levels to be close to reference cant angles and thrust levels while a maneuver is in progress. Both of these features allow the present invention to produce significant fuel savings compared to prior-art systems. The ability to control the thrust vector direction can be used to eliminate unwanted east/west coupling during north/south maneuvers, or to introduce east/west coupling intentionally when it will have a beneficial effect on the orbit. In addition to reducing the orbit control fuel required, this capability can improve the accuracy of the orbit position control making it easier to co-locate several satellites in a single geosynchronous orbital slot. The ability to control the cant angles of the thrusters can be used to improve fuel efficiency by maximizing thrust in the desired velocity change direction or to achieve other objectives as described below.

In providing the above and/or other advantages, the present invention relates to a method for controlling spacecraft velocity. A thruster torque gimbal angle command is calculated to provide a desired thruster torque demand command including a desired momentum adjust torque and a desired attitude control torque. A velocity change error between a commanded velocity change and an actual velocity change, a commanded force vector based on the error to cause the actual velocity change to approach a commanded velocity change, and force gimbal angle commands and force thrust commands to achieve the commanded force vector are calculated; and/or an error between gimbal angles and thrust levels and reference gimbal angles and thrust levels, reference gimbal angle commands and reference thrust commands to drive actual gimbal angles and thrust levels toward reference gimbal angles and reference thrust levels are calculated. A total gimbal angle command is calculated by adding the torque gimbal command with at least one of the force gimbal angle command and the reference gimbal angle command. A total thrust command is calculated including at least one of the force thrust command and the reference thrust command. The thrusters are gimbaled to the total gimbal angle command and a level of thrust produced by the thrusters is varied according to the total thrust command.

Additionally, the present invention concerns an attitude control system for a spacecraft that includes a north side, a south side, an east side, a west side, an earth-facing side, and an anti-earth facing side. The attitude control system includes at least one pair of gimbaled orbit adjust thrusters located on the north side and/or the south side of the spacecraft, the thrusters gimbaling in two directions. A controller gimbals the thrusters and operates the thrusters at a thrust level to achieve a desired velocity change and to compensate for deviations in the desired pointing of the spacecraft as a result of operation of the thrusters. The controller calculates a thruster torque gimbal angle command to provide a desired thruster torque demand command including a desired momentum adjust torque and a desired attitude control torque. The controller also calculates a velocity change error between a commanded velocity change and an actual velocity change, a commanded force vector based on the error to cause the actual velocity change to approach a commanded velocity change, and force gimbal angle commands and force thrust commands to achieve the commanded force vector are calculated; and/or the controller calculates an error between gimbal angles and thrust levels and reference gimbal angles and thrust levels, reference gimbal angle commands and reference thrust commands to drive actual gimbal angles and thrust levels toward reference gimbal angles and reference thrust levels. Furthermore, the controller calculates a total gimbal angle command by adding the torque gimbal command with at least one of the force gimbal angle command and the reference gimbal angle command. Additionally, the controller calculates a total thrust command including at least one of the force thrust command and the reference thrust command. The controller gimbals the thrusters to the total gimbal angle command and commands a level of thrust produced by the thrusters according to the total thrust command.

Still other objects and advantages of the present invention will become readily apparent by those skilled in the art from a review of the following detailed description. The detailed description shows and describes preferred embodiments of the present invention, simply by way of illustration of the best mode contemplated of carrying out the present invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

Figure 1:
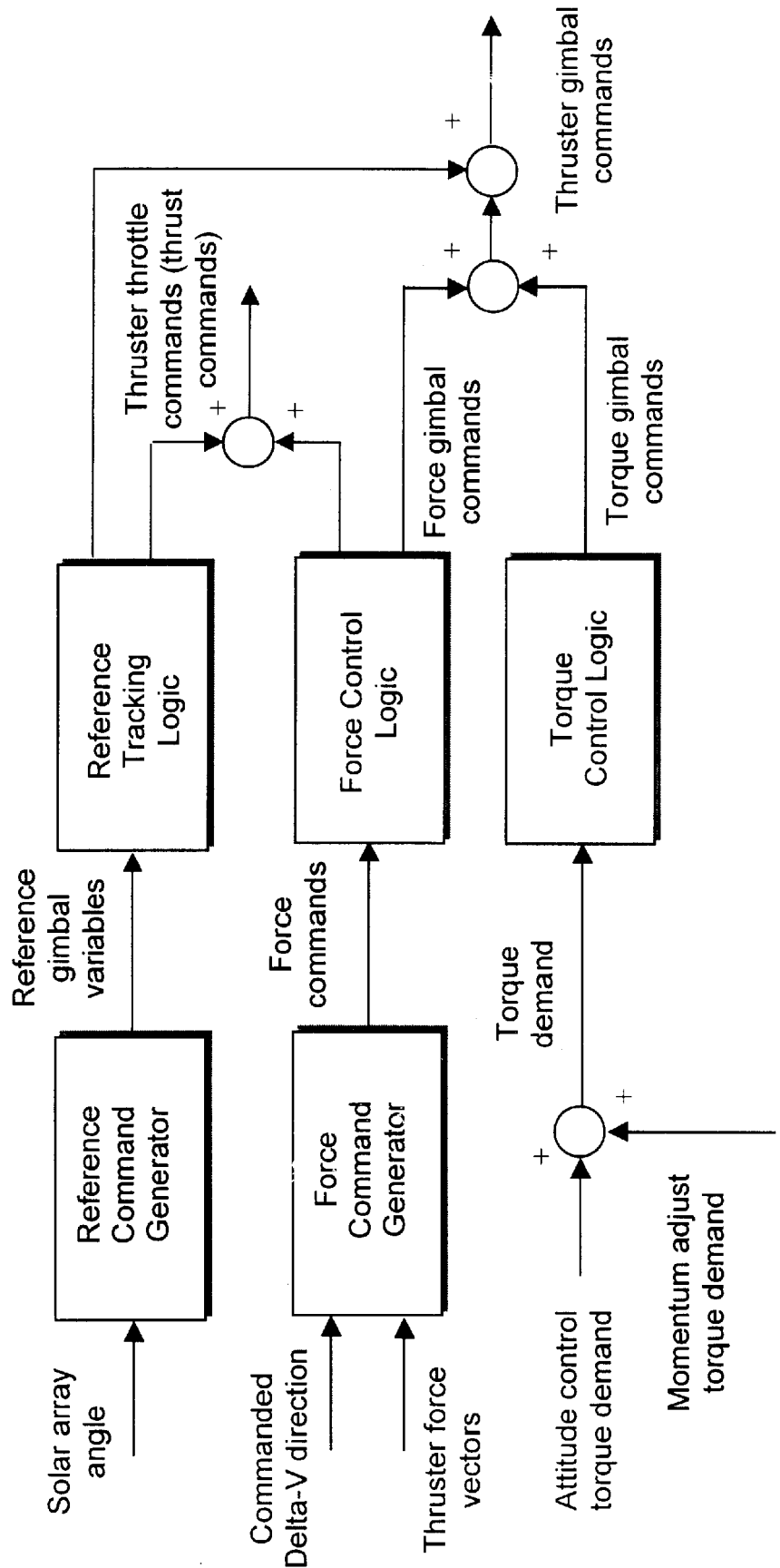
FIG. 1 represents a block diagram that illustrates flow of control logic for controlling thrusters according to an embodiment of the present invention.

The present invention provides advantages over known gimbaled thruster attitude control systems in that the present invention can provide control over the direction of the applied velocity change in addition to attitude and momentum control. Known orbit control systems do not actively control the direction of the velocity change. This increases the propellant necessary for orbit control. For example, firing thrusters to generate a thrust in the north/south direction will, in general, also produce some unwanted thrust in the east/west direction. The unwanted thrust is produced at least in part by the thruster gimbal angle changes needed to provide attitude and momentum control during the maneuver. The effect of the thrust in the east/west direction must normally be corrected by performing an additional maneuver with an associated propellant cost.

The present invention can actively gimbal and throttle thrusters to obtain a total applied velocity change in a specified direction. For example, a north/south velocity change can be achieved without an associated unwanted velocity change in the east/west direction. Alternatively, a north/south velocity change can be achieved in addition to a specified velocity change in the east/west direction, if this strategy is more advantageous from an orbit control and propellant use standpoint. As a maneuver progresses, the system can actively steer the gimbals and throttle the thrusters to achieve a desired velocity change in the presence of gimbal angles changes commanded for attitude and momentum control.

In addition to providing an applied velocity change or thrust impulse, the present invention can also drive the thruster gimbal angles and thruster thrust levels to be as close as possible to specified reference values. The reference gimbal angles or cant angles may be specified to vary as a function of solar array angle to reflect changes in the thruster plume impingement as the solar array rotates. This feature can permit the thrust in the desired velocity change direction to be maximized, which can reduce the maneuver duration and save fuel. The gimbal angle and thrust level changes required to track the reference values may be determined in such a way as to not interfere with attitude and momentum control or the ability of the system to provide the commanded thrust impulse.

The system and method according to the present invention may be used to carry out adjustments in reaction wheel assembly (RWA) momentum while a maneuver is in progress. By gimbaling the thrusters, the present invention can provide specified torques on each axis for RWA momentum adjust and attitude control, and additionally can permit the RWAs to be used for attitude control.

In providing the above-described advantage and/or other advantages, aspects of the present invention relate to a method for maneuvering a spacecraft having a north side, a south side, an east side, a west side, an earth-facing side, and an anti-earth facing side. At least two separately gimbaled thrusters may be oriented to produce thrust principally in the north or south direction. An orbital adjustment for the spacecraft is determined that may be a commanded three-axis impulse or velocity change. Both the magnitude and the direction of the impulse or velocity change are specified. Also specified are reference gimbal angles (referred to as cant angles) and reference thrust levels for each thruster, which may be selected to achieve some specified performance objective as a function of solar array angle. While a maneuver is in progress, changes to the gimbal angles are commanded that produce the torque necessary for both attitude and momentum control. It should be noted that for torque control only changes to the gimbal angles are commanded and no changes to the thruster thrust levels. To achieve the commanded impulse in the specified direction both changes in the gimbal angles and thrust levels are commanded. This portion of the control, referred to herein as the force control, can result in a change in the direction of the applied thruster force with no change in the applied torque. In addition, changes in gimbal angles and thrust levels may be commanded that produce no change to the applied torque, and that do not interfere with the force control, but that drive the gimbal angles and thrust levels as close as possible to the reference gimbal angles and thrust levels.

The present invention is useful for spacecraft including any type of thruster, two examples are Hall Current Thrusters and arcjets. Regardless of the type of thrusters the present invention is used with, the thrusters may be mounted on two-axis gimbaled platforms. Depending on the spacecraft thruster arrangement, the invention may be used to carry out any desired maneuver such as north/south stationkeeping or east/west stationkeeping, with the ability to specify the direction and magnitude of the velocity change in both cases.

Typically, the orientation of a geosynchonous spacecraft is defined with respect to the Earth. The north-south and east-west directions refer to the same directions on the earth. Portions of the spacecraft facing these directions are defined by the directions. For example, a spacecraft panel that faces the north side is referred to as the north panel. The spacecraft may also be defined by axes referred to as x, y, and z-axes or as yaw, roll, and pitch axes that are typically located at the spacecraft center-of-mass. When the spacecraft is pointing at the location directly below the spacecraft on the equator (the sub-satellite point) the axes are oriented as follows. The x-axis, or yaw axis, extends in a direction away from the Earth, the y-axis, or roll axis, is aligned with the spacecraft velocity vector in the east direction, and the z-axis, the pitch axis, is aligned with the orbit normal in the north direction.

The thrusters may be attached directly to a spacecraft panel or may be mounted on booms. However, even if not directly attached to a spacecraft panel, the thrusters typically are referred to by the closest panel. Along these lines, a thruster mounted on a boom that extends from the north panel of a spacecraft is referred to as a north panel thruster.

Figure 2:
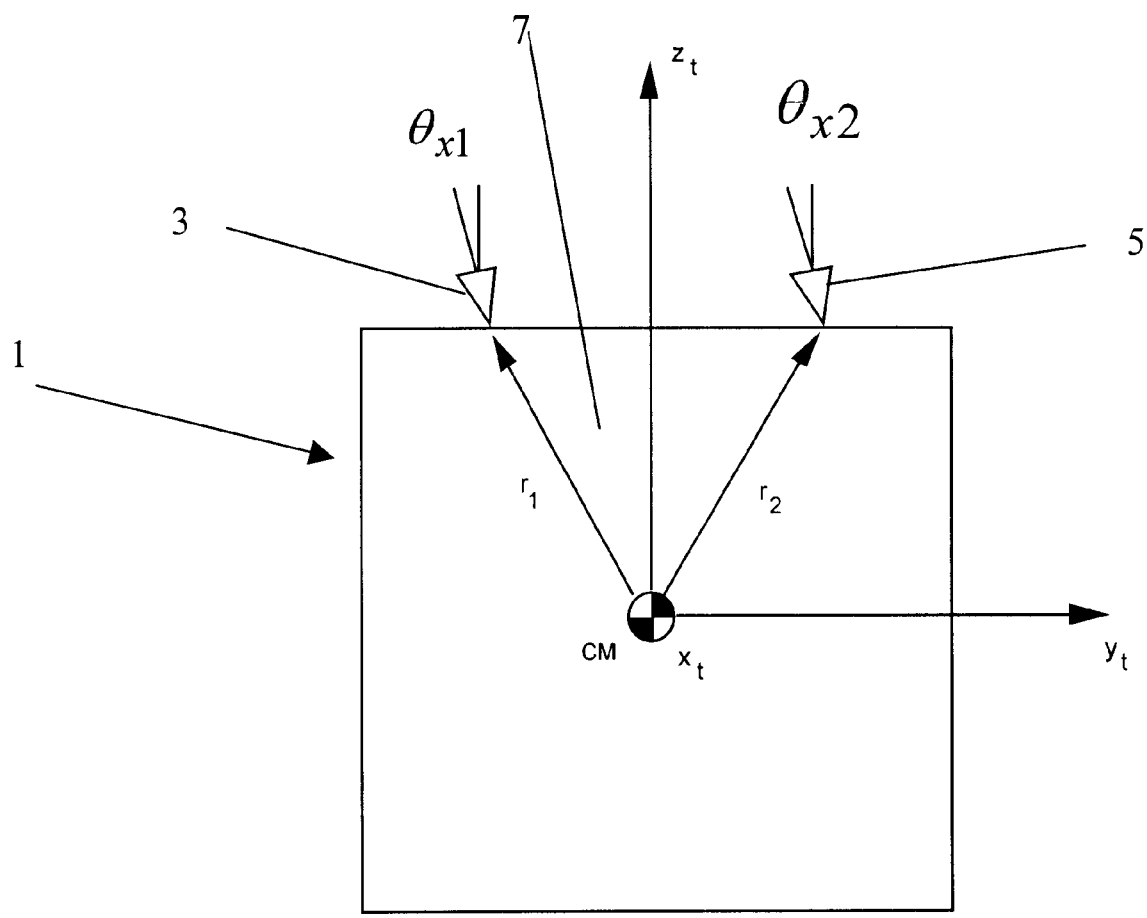
FIG. 2 represents a simple diagram that illustrates thruster orientation on a spacecraft.

Typically, on a geosynchronous communications spacecraft, thrusters, such as HCTs, are fired in pairs, with one pair located on the spacecraft north panel and/or one pair on the spacecraft south panel. The thrusters may be supported on deployable booms, and not directly attached to the spacecraft panels. FIG. 2 illustrates a pair of gimbaled thrusters 3 and 5 on a spacecraft 1 north panel 7. The pair of thrusters may be symmetrically arranged with respect to the center of mass of the spacecraft.

FIG. 2 also shows the thruster coordinate frame, which is defined as follows. The thruster roll axis $y_t$ is nominally parallel to the spacecraft roll axis and directed through the spacecraft CM. The thruster pitch axis $z_t$ is also directed through the CM, is perpendicular to $y_t$, and lies in the plane defined by the thruster position vectors $r_1$ and $r_2$. The thrusters are positioned so that $y_t$ also lies in this plane. The thruster yaw axis $x_t$ completes the right-hand triad. It should be noted that the method described below can be easily extended to thruster arrangements where the thruster roll axis, defined by the orientation of the plane containing vectors from the CM to the thrusters, is not parallel to the spacecraft roll axis. The gimbal angles $\theta_{x1}$ and $\theta_{x2}$ shown in FIG. 2 represent the first gimbal axis rotation of each gimbaled thruster. The second gimbal rotation axis of each thruster (not shown) is perpendicular to the first rotation axis.

FIGS. 3a and 3b show a more detailed view of a particular embodiment of a spacecraft according to the present invention. In this embodiment, a pair of thrusters 11, 13 and 15, 17 is mounted on each of the north panel 19 and south panel 21 of the spacecraft 9. Each thruster is mounted on a gimbal platform 23, 25, 27, and 29. A rocket engine assembly (REA) 31 is arranged on the north panel 19. There are four individual REAs, one positioned at a corner of the north panel. A solar array 33 and 35 extends from each of the north panel and south panel, respectively.

Figure 3:
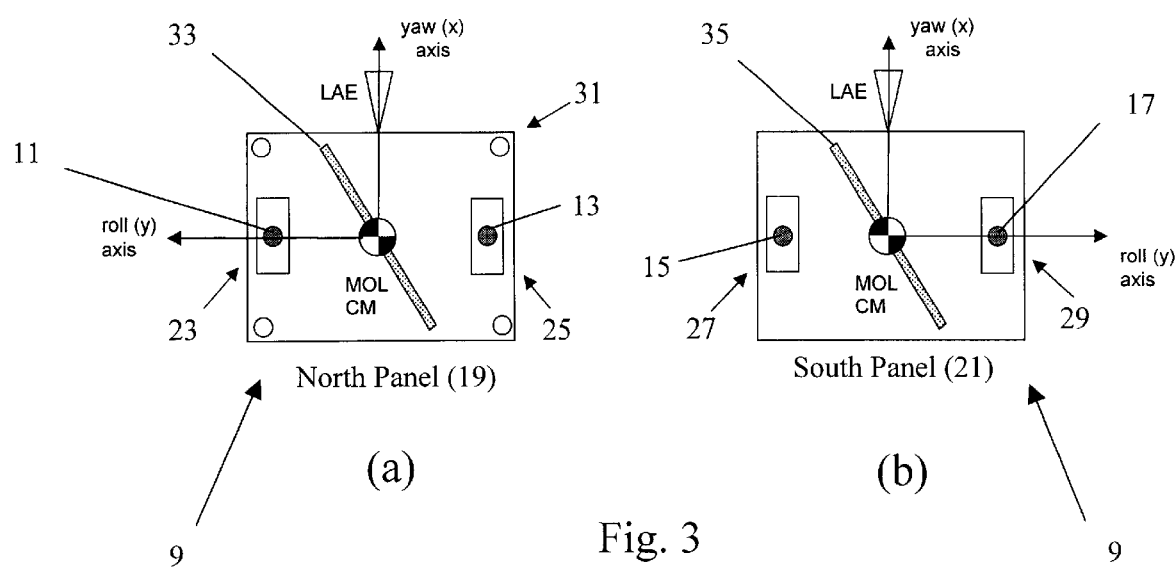
FIGS. 3a and 3b respectively, views of a north and south panel of a spacecraft including gimbaled maneuvering thrusters according to the present invention.

The center of mass (CM) and the roll and yaw axes are also shown on the spacecraft in FIGS. 3a and 3b. In FIG. 3, the center of mass is the middle-of-life center-of-mass (MOL CM). Since the center of mass moves along the x-axis over life as propellant is expended, the coordinates are referenced to the CM's location at the middle of the mission.

Additionally, the spacecraft shown in FIG. 3 includes a Liquid Apogee Engine or LAE, which is a large thruster used for orbit transfer. This is different from the thrusters that are the subject of the present invention.

FIGS. 3a and 3b illustrate a pair of thrusters on each of the north and south panels of a spacecraft. The thrusters in such an embodiment typically are symmetrically arranged with respect to the center of mass of the spacecraft. The present invention typically includes two thrusters fired on two separate gimbaled platforms. For example, a thruster fired on platform 23 and one fired on platform 25 for north/south stationkeeping, and/or one on platform 23 and one on platform 29 for east/west stationkeeping. The invention can also be applied if more than two thrusters are fired.

To stabilize a spacecraft, the spacecraft may include at least one reaction wheel assembly (RWA). Reaction Wheel Assemblies (RWAs) are momentum exchange devises used for attitude control. Each RWA includes a rotor. A torque is applied to the RWA that causes its rotor speed to change and an equal and opposite torque to be applied to the spacecraft.

Typically, a minimum of 3 non-colinear RWAs are needed to control a spacecraft attitude, although 4 RWAs are usually included for redundancy. During normal operations, for the spacecraft to remain pointed at the Earth, the RWAs must absorb the angular momentum imparted by the external disturbance torques. Therefore, over time the RWA speeds will increase. To prevent speeds in excess of the hardware's capability, the momentum stored in the RWAs must be periodically removed. Momentum adjust may be conveniently performed during orbit correction maneuvers, during which external torques are applied to the spacecraft using the gimbaled thrusters.

The present invention may be used in the alteration of momentum of an RWA in addition to carrying out north-south stationkeeping. Furthermore, the present invention may be utilized to carry out a velocity and/or a momentum change in any direction.

A controller controls the gimbaling and firing, including timing and thrust level, of the thrusters. The controller controls the thrusters in accordance with the method set forth below. Any known controller may be utilized. However, unlike currently utilized controllers, the controller will control the gimbaling and thrust levels of the thrusters to generate a velocity change in a specified direction that may have both east-west and north-south components. The controller can control the thrusters independently, to point in the same or different directions and to fire simultaneously or sequentially. Based on attitude information generated using one or more attitude sensors and based on RWA momentum information, the controller can adjust the thruster gimbal angles and or thrust timing and/or thrust level during a maneuver to compensate for changes during firing. Those of ordinary skill in the art once aware of this disclosure will be able to determine a suitable controller and program it to carry out the invention as described below.

According to the present invention, one or more sensors within a spacecraft can sense three-axis attitude and stored momentum of a reaction wheel assembly or other spacecraft actuator. The sensor(s) could include attitude orientation sensors such as three-axis gyros, earth sensors, sun sensors, and/or star trackers. The sensors provide information on the attitude pointing errors relative to an earth-oriented reference coordinate frame. Based on these errors a controller generates a torque demand that when applied to the spacecraft in part by the gimbaled thrusters and in part by other actuators reduces the attitude errors. In the context of momentum adjust, sensors may sense the RWA speeds. A torque demand would be generated based on the speeds that when applied to the spacecraft by the gimbaled thrusters causes the RWA speeds to change in the desired direction. Any attitude or momentum sensors may be used in a system according to the present invention and those of ordinary skill in the art would be able to determine appropriate sensors to use without undue experimentation.

FIG. 1 represents a block diagram of an embodiment of gimbaled thruster control logic according to the present invention. FIG. 1 does not show all elements of a system according to the present invention. Rather, FIG. 1 represents just a portion of logic that may be implemented on-board the spacecraft in flight software. The system may be used to perform orbit control maneuvers. These maneuvers involve thruster firing for a period of time to achieve a specified total impulse or velocity change.

The system includes thrusters as described above that are mounted on two-axis gimbaled platforms, in other words, platforms that can rotate about two orthogonal axes. The system typically includes at least two thrusters, each mounted on its own gimbaled platform. The vectors from the spacecraft center of mass (CM) to the gimbaled platforms typically cannot be co-linear. This means that the platforms are geometrically separated. FIG. 2 shows a typical arrangement.

The thrusters may or may not be throttled, that is, have thrust levels that can be commanded. However, typically, the thrusters are throttled. If the thrusters are not throttlable, the cant angles of the thrusters can still be varied without affecting the attitude or momentum control. That is, the gimbal angles can be driven as close as possible to reference gimbal angles without altering the torque required for attitude and momentum control. Using reference angles that vary with solar array angle can permit the present invention to maximize the maneuver fuel efficiency by taking into account how the solar array plume impingement changes as the solar array rotates.

A system according to the present invention may be employed in maneuvering a spacecraft. According to the method of the present invention an orbital adjustment is determined, which may be expressed as a velocity change or total impulse to be achieved simultaneously in the north/south and east/west direction. In addition to the velocity change, a change in the RWA momentum may also be prescribed. As the maneuver progresses the gimbals are actively steered to generate the torque required to control the spacecraft attitude and achieve the commanded RWA momentum. In addition, the gimbals are steered and the thrust levels are modulated to make corrections in the direction of the thrust necessary to achieve the commanded velocity change.

With respect to adjusting RWA momentum during stationkeeping maneuvers, when the thrusters are being fired, the present invention may determine a momentum adjust torque that will drive the RWAs from one momentum to a commanded momentum. The momentum adjust torque may be applied along with some portion of the attitude control torque demand to the RWAs. At the same time, the momentum adjust torque may be summed with another portion of the attitude control torque to determine a total torque that is input to the gimbaled thruster control logic according to the invention. Changes in thruster gimbal angles may be determined that generate an external torque on the spacecraft that cancels out the torque generated by the RWAs as their momentum changes. Using this feedforward approach, momentum adjust may be accomplished without producing attitude pointing transients.

The present invention may be carried out with a system as shown in FIG. 1. The Gimbaled Thruster Control Logic (GTCL) consists of three separate portions that perform different functions. The first portion, the torque control portion, commands changes in the thruster gimbal angles to generate the torque required for attitude and momentum control. The second portion, the force control portion, commands changes in gimbal angles and thrust levels to achieve a total velocity change or thrust impulse in a specified direction. The third portion, the reference control portion, commands changes in gimbal angles and thrust levels to drive these quantities as close as possible to specified reference gimbal angles and thrust levels. According to the present invention, any one, any two, or all three portions can operate simultaneously without interfering with each other. Significantly, the present invention can involve adjustments to torque in addition to force and/or reference control.

The total gimbal angle commanded is the sum of the gimbal angle commands due to the torque control, force control, and the reference control. After calculation, the total gimbal angle commands may then be sent to the gimbal drive electronics that move the gimbals. The thrust levels commanded are the sum of the thrust levels due to the force control and the reference control. The total thrust commands may be sent to the thruster control electronics that can be used to modulate the thruster power level or fuel flow to achieve the change in thrust. Note that the logic operates continuously while a maneuver is in progress in a closed loop manner and at regular intervals, denoted as the control cycle, issues both gimbal angle and thrust commands to achieve the control objectives described below.

As shown in FIG. 1, an attitude control torque demand and a momentum adjust torque demand may be summed to obtain a total torque demand that is input to the Torque Control Logic. The Torque Control Logic may determine changes in the gimbal angles for torque control, denoted as torque gimbal commands. Note that the momentum adjust portion of the system is optional.

According to the present invention, attitude control logic on-board the spacecraft may generate torque commands necessary to keep the spacecraft pointed in the correct direction. The torques may be generated in response to attitude errors sensed by attitude sensors, for example, earth sensors, sun sensors, or star trackers, and rate errors sensed by gyros. The attitude and rate errors may be input to a proportional-integral-derivative (PID) controller (the PID controller is not shown in FIG. 1). The PID controller may be used to calculate the torque demand for attitude control, which may be calculated as the sum of the proportional torque demand, the integral torque demand, and the derivative torque demand.

The proportional torque demand may be defined as the torque demand proportional to the attitude error. Also, the integral torque demand may be defined as the torque demand proportional to the integral of the attitude error. Furthermore, the rate torque demand may be defined as the torque demand proportional to the rate error. All of the torque demand, or only a portion of it, for example, only the integral torque demand, may be input to the GTCL. The rest of the torque demand, which may be defined as the portion not applied to the GTCL, may be applied to the RWAs, other thrusters, or other control actuators.

As further diagramed in FIG. 1, a commanded velocity change direction and force vectors for each gimbaled thruster may be input to a Force Command Generator. The force vectors, which may be calculated on-board based on the thruster thrust level and the gimbal orientations, may also be used to determine the total velocity change or total applied thrust impulse. Based on the difference between the commanded velocity change or impulse and the actual velocity change or impulse, the logic generates a force vector command.

The force vector command represents the change in force necessary to drive the actual velocity change or impulse towards the commanded velocity change or impulse as the maneuver progresses. The Force Control Logic computes changes in gimbal angle, denoted as force gimbal commands, and thruster throttle commands, or thrust commands, necessary to achieve the commanded force. The force gimbal commands and thrust commands may be determined in such a way as to leave the torque applied for attitude and momentum control unaffected. Note that using the gimbaled and throttled thrusters the thruster force typically can only be controlled in two directions in a plane that contains the vectors from the center-of-mass to the two thrusters being fired. For the thruster arrangement of FIG., 2, the thrust can be controlled in the $y_t$/$z_t$ plane, but typically cannot be controlled in the direction perpendicular to this plane (the $x_t$ direction). Therefore, in the case where $y_t$ is parallel to the spacecraft roll axis, the thrust component in the east/west ($y_t$) direction can be controlled, but radial thrust (thrust in the $x_t$ direction) that cannot be controlled.

Finally, as shown in FIG. 1, the solar array angle may be input to a Reference Command Generator. The Reference Command Generator can generate reference gimbal angles and thrust levels for each thruster. The reference gimbal angles may be a function of the solar array angle and represent desired cant angles of the thrusters relative to the solar array that provide maximum thrust in the desired direction and the greatest fuel efficiency. The reference angles therefore may represent the optimal trade between cosine loss, or cant angle loss, and plume drag on the solar array. Alternatively, the gimbal angles may be selected to limit solar array thruster plume exposure to acceptable levels as the solar array rotates and the thruster/solar array geometry changes.

The reference thrust levels may be values that result in the most efficient thruster operation or values selected based on some other criteria. The logic may calculate the error between the reference values and the actual values of the gimbal angles and thrust levels. Using this error, the logic can drive the gimbal angles and thrust levels towards the reference values. The reference control may be applied without changing the torque commanded for attitude and momentum control.

In addition, the operation of the reference control does not inhibit the force control from achieving the commanded velocity change or total impulse. Note that in the case that the thrusters cannot be throttled, the force control is not applicable, but the reference control is still possible. The reference control can be used to control the thruster cant angles and to make changes in the thrust component in the velocity change direction.

In the following description, the first gimbal axis is assumed to be along the x-axis of the spacecraft and the rotation about this axis is denoted as $\theta_{x1}$ for the $1^{st}$ platform ($\theta_{x2}$ for the $2^{nd}$ platform). The second axis is perpendicular to the first axis, and a rotation about this axis is denoted as $\theta_{y1}$. Note that when $\theta_{x1}=0$, the second gimbal axis is aligned with the spacecraft y-axis.

According to some embodiments of the present invention the thrust of the thruster can also be commanded to vary The thrust of Gimbaled Thruster 1 (GT 1) is denoted as $T_1$ and the thrust of Gimbaled Thruster 2 (GT 2) is denoted as $T_2$.

A 4×1 vector g, which contains the gimbal angles of GT 1 and the gimbal angles of GT 2, will be referred to as the gimbal angle vector, and another 6×1 vector $\bar{g}$ (g with a bar on top), which contains the thrust values and the gimbal angles of GT 1 and GT 2, will be referred to as the "gimbal variable vector".

The force $f_1$ applied by GT 1 can be calculated as shown by equation (1)

$$f_1 = \begin{Bmatrix} \sin(\theta_{y1}) \\ -\sin(\theta_{x1})\cos(\theta_{y1}) \\ \cos(\theta_{x1})\cos(\theta_{y1}) \end{Bmatrix} T_1 \qquad (1)$$

where the subscript 1 denotes the association with GT 1. The change in the force generated by GT 1 due to a change in its gimbal angles $\Delta\theta_{x1}$ and $\Delta\theta_{y1}$ and a change in its thrust by $\Delta T_1$ may be given by equation (2)

$$\Delta f_1 = \qquad (2)$$
$$\begin{bmatrix} \sin\theta_{y1} & 0 & T_1\cos\theta_{y1} \\ -\sin\theta_{x1}\cos\theta_{y1} & -T_1\cos\theta_{x1}\cos\theta_{y1} & T_1\sin\theta_{x1}\sin\theta_{y1} \\ \cos\theta_{x1}\cos\theta_{y1} & -T_1\sin\theta_{x1}\cos\theta_{y1} & -T_1\cos\theta_{x1}\cos\theta_{y1} \end{bmatrix} \begin{Bmatrix} \Delta T_1 \\ \Delta\theta_{x1} \\ \Delta\theta_{y1} \end{Bmatrix}$$

According to the present invention, the torque may be controlled by commanding changes in the gimbal angles, without commanding changes in thrusts. The change in torque of GT 1 due to a change in its gimbal angles by $\Delta\theta_{x1}$ and $\Delta\theta_{y1}$ may be calculated according to equation (3) below $$\Delta\tau_1 = \begin{bmatrix} 0 & -z_1 & y_1 \\ z_1 & 0 & -x_1 \\ -y_1 & x_1 & 0 \end{bmatrix} \qquad (3)$$
$$\begin{bmatrix} 0 & T_1\cos\theta_{y1} \\ -T_1\cos\theta_{x1}\cos\theta_{y1} & T_1\sin\theta_{x1}\sin\theta_{y1} \\ -T_1\sin\theta_{x1}\cos\theta_{y1} & -T_1\cos\theta_{x1}\cos\theta_{y1} \end{bmatrix} \begin{Bmatrix} \Delta\theta_{x1} \\ \Delta\theta_{y1} \end{Bmatrix}$$
$$= A_1 \Delta g_1$$

where $A_1$ is a 3×2 matrix, $\Delta g_1$ is a 2×1 vector containing $\Delta\theta_{x1}$ and $\Delta\theta_{y1}$, and $r_1=[x_1, y_1, z_1]$ is the vector from the spacecraft center-of-mass to the platform 1 gimbal.

Equations similar to Equation 1–3 for GT 2 may be utilized to calculate the force $f_2$, the change in force $\Delta f_2$ and change in torque $\Delta\tau_2$ due to change in the $2^{nd}$ platform gimbal angles by $\Delta\theta_{x2}$ and $\Delta\theta_{y2}$. With the subscript 1 changed to subscript 2, the Equations 1–3 become Equations 1a, 2a, and 3a, respectively.

The total change in torque is the sum of the change in torque due to GT 1 and the change in torque due to GT 2

$$\Delta\tau = \Delta\tau_1 + \Delta\tau_2 \qquad (4)$$

$$= A_1\Delta g_1 + A_2\Delta g_2 \quad \text{(using Equations 3 and 3a)}$$

$$= [A_1 \; A_2]\begin{Bmatrix}\Delta g_1 \\ \Delta g_2\end{Bmatrix}$$

$$= A\,\Delta g_t$$

where A is a 3×4 matrix and $\Delta g_t$ is a 4×1 vector. Each control cycle, a commanded torque change $\Delta\tau_c$ may be determined according to Equation (5)

$$\Delta\tau_c = T_d - T_g \qquad (5)$$

where $T_d$ is the sum of the attitude control torque demand, the momentum adjust torque demand, and any commanded torque bias, and $T_g$ is the total torque produced by GT 1 and GT 2 given by $T_g = r_1 \times f_1 + r_2 \times f_2$. The $\Delta g_t$ that provides the required $\Delta\tau_c$ is then calculated according to equation (6)

$$\Delta g_t = P\Delta\tau_c \qquad (6)$$

where P is the 4×3 pseudo-inverse of A computed as $P = A^t(AA^t)^{-1}$.

The torque control vector $\Delta g_t$ calculated using Equation (6) is a 4×1 vector containing the change in two gimbal angles for GT 1 and two gimbal angles for GT 2. This vector is expanded into a 6×1 gimbal variable vector $\Delta\bar{g}_t$ as shown in Equation (7)

$$\Delta\bar{g}_t = \begin{bmatrix} 0 \\ \Delta\theta_{x1} \\ \Delta\theta_{y1} \\ 0 \\ \Delta\theta_{x2} \\ \Delta\theta_{y2} \end{bmatrix} \qquad (7)$$

This torque control vector, which commands no change in the thruster thrust levels (hence the zeros in rows 1 and 4), will be later combined with the force control vector that commands both changes to gimbal angles and thrust to obtain a total maneuver impulse in the commanded direction d. In order to achieve the force control, the total 3×1 impulse vector I may be calculated by integrating the sum of the 3×1 force vectors for GT 1 and GT 2 according to Equation (8)

$$I(t) = \int_0^t (f_1 + f_2)dt \qquad (8)$$

Also, the 3×1 impulse error vector (the total impulse perpendicular to d) may be calculated according to Equation (9)

$$E = I - (I \cdot d)d \qquad (9)$$

The 3×1 force error vector (force perpendicular to d) may be calculated from Equation (10)

$$f_E = f_1 + f_2 - ((f_1 + f_2)\cdot d)d \qquad (10)$$

Three 6×1 vectors $n_d$, $n_e$ and $n_0$ are calculated, which are called the null vectors. The special property of these null vectors is that the change in the total torque due to a small change in the gimbal variables $\Delta\bar{g}$ proportional to (in the direction of) the null vector is close to zero. This also means that any linear combination of the null vectors is a null vector. The first null vector $n_d$ has the property that commanding changes in the gimbal variable $\Delta\bar{g}$ in the direction of $n_d$ will produce a change in force along d without any change in the torque. Similarly, the second null vector $n_e$ has the property that commanding changes in $\Delta\bar{g}$ along $n_e$ will produce a change in force perpendicular to d without any change in torque. The third null vector $n_0$ has the property that commanding changes in $\Delta\bar{g}$ along $n_0$ will produce no change in either the force or the torque.

To implement the force control, a required change in the gimbal variable vector $\Delta\bar{g}_f$ is calculated as follows utilizing Equation (11)

$$\Delta\bar{g}_f = -((k_1 f_E + k_2 E)\cdot e)n_e \qquad (11)$$

where the 3×1 unit vector e is the direction of the change in force due to the change in the gimbal variables along $n_e$. The force control gains $k_1$ and $k_2$ are positive and are selected to provide good transient response properties of the closed-loop system. Note that because $\Delta\bar{g}_f$ is along $n_e$, no change in torque will result from the force control, and hence the force and torque control are effectively de-coupled. Also, note that in the case where the thrusters cannot be throttled, $\Delta\bar{g}_f$ is set to zero. The effect of commanding changes in the gimbal angles and thrust levels according to Equation (11) is to drive the error impulse E perpendicular to the commanded direction d to zero during the maneuver. Including the force error $f_E$ in the control equation provides a stable and well-behaved system response.

In addition to providing torque and force control, the system can either (a) control the gimbal variable vector to be as close as possible to a reference gimbal variable vector, or (b) maximize the total force in the direction of the commanded impulse. According to one embodiment of the present invention, a 6×1 reference gimbal variable vector $\bar{g}_r$ is prescribed, which may be a constant, or may vary depending on the solar array angle, or may be derived to satisfy some other system requirement. An objective of the controller is to command the gimbal variable vector to be as close as possible to the reference gimbal variable vector while at the same time performing the torque and force control.

In each control cycle, a change in the gimbal variable $\Delta\bar{g}_r$ may be calculated using the reference gimbal variable $\bar{g}_r$, the current gimbal variable $\bar{g}_0$, and a 6×6 diagonal weighting matrix W. The weighting matrix values can determine the relative importance of an error between each element of the reference gimbal variable and the current gimbal variable. For example, if the diagonal elements of W corresponding to the GT 1 and GT 2 thrust levels are set to zero (elements W(1,1) and W(4,4)), then the reference thrust values are ignored in determining the throttle settings. According to one embodiment, the required change in the gimbal variable $\Delta\bar{g}_r$ is calculated according to Equation (12)

$$\Delta\bar{g}_r = \alpha N(N^t W N)^{-1} N^t W \bar{g}_e$$

where, $$\bar{g}_e = \bar{g}_r - \bar{g}_0$$

and $$N = [n_d\, n_0] \qquad (12)$$

In Equation 12, the value of $\alpha$ determines the step size taken each control cycle and is typically 1 or less. Note that if the total commanded change in the gimbal variables ($\Delta \bar{g}_t + \Delta \bar{g}_f + \Delta \bar{g}_r$) has any element larger than a threshold (usually determined by the hardware), then the value of $\alpha$ is reduced for the current time step. In embodiments where there is no throttling, the matrix N contains only one column ($n_d$) because only one null vector exists.

According to another embodiment of the present invention, as stated earlier, the reference gimbal variables may not be given, and it may be required to maximize the force in the direction d, thus minimizing the total maneuver time and increasing the fuel efficiency. This objective is achieved by calculating $\Delta \bar{g}_r$ according to Equation (13)

$$\Delta \bar{g}_r = N \begin{Bmatrix} \beta_d \\ \beta_0 \end{Bmatrix} \quad (13)$$

where $\beta_d$ and $\beta_0$ are selected such that the total commanded change in the gimbal angles ($\Delta \bar{g}_t + \Delta \bar{g}_f + \Delta \bar{g}_r$) has no element larger than the threshold (usually determined by the hardware) but with $\beta_d$ as large as possible. In embodiments that do not include throttling, as explained earlier, the matrix N contains only one column ($n_d$) and hence there is no $\beta_0$ in Equation (13).

Finally, the change in the gimbal variables (gimbal angles and thrusts) is commanded according to Equation (14) as follows $$\Delta \bar{g}_c = \Delta \bar{g}_t + \Delta \bar{g}_f + \Delta \bar{g}_r \quad (14)$$

It is important to realize that only a few embodiments of the present invention have been described herein. Many other arrangements are possible. For example, according to some embodiments, some of the thrusters are gimbaled and some of the thrusters are fixed and cannot be gimbaled. Also, any number of thrusters may be located on any combination of sides of a spacecraft. According to other embodiments, none of the control torque is provided by the gimbals, but rather is supplied using other actuators such as REAs or RWAs or a combination of RWAs and REAs. Furthermore, some embodiments can include thrusters on single-axis rather than two-axis gimbals. In reality, any combination of gimbaled and/or fixed thrusters and thruster placement may be utilized as well as torque control by other means. Those of ordinary skill in the art, once aware of the disclosure contained herein, could determine without undue experimentation desirable thruster arrangements, characteristics, and details of their operation as well as torque control elements.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A method for controlling spacecraft velocity, the method comprising:
  A) calculating thruster torque gimbal angle command to provide a desired thruster torque demand command including a desired momentum adjust torque and a desired attitude control torque;
  B) performing at least one of
    1) calculating a velocity change error between a commanded velocity change and an actual velocity change, calculating a commanded force vector based on the error to cause the actual velocity change to approach a commanded velocity change, and calculating force gimbal angle commands and force thrust commands to achieve the commanded force vector, and
    2) calculating an error between gimbal angles and thrust levels and reference gimbal angles and thrust levels, calculating reference gimbal angle commands and reference thrust commands to drive actual gimbal angles and thrust levels toward reference gimbal angles and reference thrust levels;
  C) calculating a total gimbal angle command by adding the torque gimbal command with at least one of the force gimbal angle command and the reference gimbal angle command;
  D) calculating a total thrust command comprising at least one of the force thrust command and the reference thrust command; and
  E) gimbaling the thrusters to the total gimbal angle command and varying a level of thrust produced by the thrusters according to the total thrust command.

2. The method according to claim 1, wherein a roll axis of the thrusters is parallel to a roll axis of the spacecraft.

3. The method according to claim 1, wherein a roll axis of the thrusters is not parallel to a roll axis of the spacecraft.

4. The method according to claim 1, wherein the thrusters are gimbaled in two axes.

5. The method according to claim 1, wherein the method carries out north-south stationkeeping maneuvers of the spacecraft including a change in velocity of the spacecraft in an east-west direction and an adjustment in the momentum of the spacecraft reaction wheel assemblies.

6. The method according to claim 5, wherein a pair of thrusters is operated on at least one of a north side and a south side of the spacecraft.

7. The method according to claim 5, wherein a pair of symmetrically arranged thrusters on at least one of a north side and a south side of the spacecraft is gimbaled and operated.

8. An attitude control system for a spacecraft that includes a north side, a south side, an east side, a west side, an earth-facing side, and an anti-earth facing side, the attitude control system comprising:
  A) at least one pair of gimbaled orbit adjust thrusters located on at least one of the north side and the south side of the spacecraft, the thrusters gimbaling in two directions; and
  B) a controller for gimbaling the thrusters and operating the thrusters at a thrust level to achieve a desired alteration of the orbit of the spacecraft and for compensating for attitude deviations resulting from operation of the thrusters, wherein the controller:
    1) calculates a thruster torque gimbal angle command to provide a desired thruster torque demand command including a desired momentum adjust torque and a desired attitude control torque;

2) performs at least one of
- a) calculating a velocity change error between a commanded velocity change and an actual velocity change, calculating a commanded force vector based on the error to cause the actual velocity change to approach a commanded velocity change, and calculating force gimbal angle commands and force thrust commands to achieve the commanded force vector, and
- b) calculating an error between gimbal angles and thrust levels and reference gimbal angles and thrust levels, calculating reference gimbal angle commands and reference thrust commands to drive actual gimbal angles and thrust levels toward reference gimbal angles and reference thrust levels;

3) calculates a total gimbal angle command by adding the torque gimbal command with at least one of the force gimbal angle command and the reference gimbal angle command;

4) calculates a total thrust command comprising at least one of the force thrust command and the reference thrust command; and 5) gimbals the thrusters to the total gimbal angle command and varying a level of thrust produced by the thrusters according to the total thrust command.

9. The attitude control system according to claim 8, wherein the changes in spacecraft velocity are in an east-west direction.

10. The attitude control system according to claim 8, further comprising:

at least one reaction wheel assembly for stabilizing the spacecraft, wherein the changes in momentum result from adjustment of the momentum of a reaction wheel assembly.

11. The attitude control system according to claim 10, further comprising:

at least one sensor for detecting a momentum of the at least one reaction wheel assembly.

12. The attitude control system according to claim 8, wherein a roll axis of the thrusters is parallel to a roll axis of the spacecraft.

13. The attitude control system according to claim 8, wherein a roll axis of the thrusters is not parallel to a roll axis of the spacecraft.

14. The attitude control system according to claim 13, wherein the thrusters of each pair of thrusters are symmetrically arranged with respect to the spacecraft center-of-mass.

15. The attitude control system according to claim 8, wherein the controller operates the thrusters to carry out north-south stationkeeping and to simultaneously achieve a velocity change in the east-west direction and a change in reaction wheel momentum.

16. The attitude control system according to claim 8, wherein the thrusters are Hall Current Thrusters.

17. The attitude control system according to claim 8, wherein the thrusters are arcjets.

* * * * *